April 12, 1960 E. H. BLATTNER Re. 24,808

UNIVERSAL COUPLER AND YOKE CONNECTION

Original Filed Jan. 18, 1957 3 Sheets-Sheet 1

Inventor:
Emil H. Blattner

By Wilmer Mechlin
his Attorney

UNIVERSAL COUPLER AND YOKE CONNECTION

Original Filed Jan. 18, 1957 3 Sheets-Sheet 2

Inventor:
Emil H. Blattner
By Wilmer Mechlin
his Attorney

UNIVERSAL COUPLER AND YOKE CONNECTION

Original Filed Jan. 18, 1957 3 Sheets-Sheet 3

Inventor:
Emil H. Blattner
By Wilmer Mechlin
his Attorney

United States Patent Office

Re. 24,808
Reissued Apr. 12, 1960

24,808

UNIVERSAL COUPLER AND YOKE CONNECTION

Emil H. Blattner, deceased, late of Williamsville, N.Y., by Elizabeth Blattner, executrix, Rochester, N.Y.; said Emil H. Blattner, assignor to Symington Wayne Corporation, a corporation of Maryland Original No. 2,841,295, dated July 1, 1958, Serial No. 635,024, January 18, 1957. Application for reissue April 10, 1959, Serial No. 805,651

10 Claims. (Cl. 213—72)

Matter enclosed in heavy brackets [ ] appears in the original patent but forms no part of this reissue specification; matter printed in italics indicates the additions made by reissue.

This invention relates to a universal coupler and yoke connection and has for its primary object the provision of improved pin connection for connecting a coupler and yoke for limited relative universal angling.

The present A.A.R. alternate standard type "F" coupler is connected to an associated vertical yoke by a single pin extending through an aperture in the butt portion of the coupler and having its ends received in openings in the arms of the yoke between which the butt portion of the coupler extends. The pin itself is cylindrical and there is interposed between it and the rear wall of the yoke a pin bearing block having a cylindrically concave front face rotatably engaging the pin and a [cylindrically] *spherically* convex rear face disposed normal to its front face and received in a recess of corresponding configuration in the rear wall of the yoke. By this construction, the coupler, when angling horizontally relative to the yoke, may angle either with or relative to the pin and in angling vertically, angles about the bearing block and relative to both pin and yoke. While this construction affords the desired relative universal angling of coupler and yoke, in order to provide the thickness necessary for strength in the filler block without excessive rearward extension of the butt of the coupler, it has been considered essential to hold the rear wall of the coupler between the [cylindrically] *spherically* convex recess and the rear or butt end of the coupler to a thickness of about one and one-half inches. The result, under very severe service conditions, has been that the couplers have exhibited a tendency to break through their rear walls under high buffing blows. It is this tendency that the connection of the present invention is designed to eliminate by enabling the [horizontally directed, cylindrically] convex [surfaces] *surface* engaged by the coupler for relative vertical angling to be made integral with the rear part of the connecting pin so that the rear wall of the coupler can be thickened and strengthened beyond the point of possible breakage at the expense of the space now alloted to the separate bearing block.

Another object of the invention is to provide an improved connecting pin for universally connecting a coupler and yoke which is itself so connected to the yoke as to have at least limited horizontal rotation relative thereto and has, integral with its rear portion, a surface matable with the coupler for limited vertical angling of the coupler relative to the yoke.

An additional object of the invention is to provide an improved universal coupler and yoke connection wherein a connecting pin, while having integrally formed with its rear portion a protuberance carrying a [cylindrically] convex surface [disposed substantially normal to the axis of the pin], is insertible in place through one of the pin-receiving openings in the arms of the yoke.

A further object of the invention is to provide an improved universal coupler and yoke connection wherein the connection is made by a vertically split pin, the rear part carrying an integral protuberance matable with a recess of corresponding configuration in a rear wall of the coupler for limited vertical angling of the latter and the split being such that the parts of the pin can be inserted through one of the pin-receiving openings in the arms of the yoke without eliminating surface contact between the yoke and rear part of the pin.

Another object of the invention is to provide an improved universal coupler and yoke connection wherein the connection for both horizontal and vertical relative angling is made by a split pin so split that its parts may be inserted separately through one of the pin-receiving openings in the arms of the yoke while being held against relative movement when in connecting position.

Other objects and advantages of the invention will appear hereinafter in the detailed description, be particularly pointed out in the appended claims and be illustrated in the accompanying drawings, in which:

Figure 1:
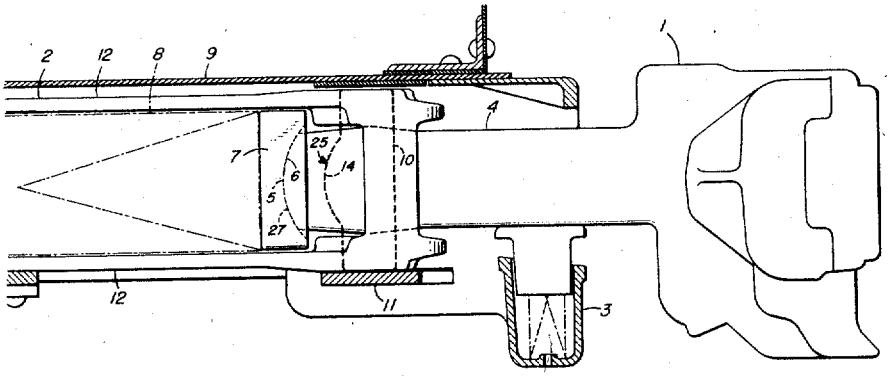
Figure 1 is a side elevational view of a coupler and yoke mounted in the center sills of a railway car and connected by an embodiment of the universal coupler and yoke connection of the present invention, portions of the associated draft rigging being broken away and shown in section to more clearly illustrate certain of the details of construction.

Referring now in detail to the drawings, in which like reference characters designate like parts, the improved universal coupler and yoke connection of the present invention is adapted to connect a coupler and yoke for relative universal movement by a single pin. In this respect, it is similar to the conventional connection for an A.A.R. alternate standard type "F" coupler. However, it differs from the conventional connection in dispensing with the need for a separate pin bearing block by making the [horizontally directed cylindrical] *convex* surface about which the coupler angles vertically integral with the connecting pin and relying on the rotatability of the pin relative to the yoke for the relative horizontal angling of the coupler. The improved connection thereby enables the rear wall of the coupler to be thickened to about two and one-half inches and there strengthened beyond the point of possible breakage with at most minor modification of the parts of the draft rigging with which the coupler and yoke are associated.

The above characteristics are common to the several exemplary forms of the improved connection and the connecting pin for use therewith shown in the drawings. For purposes of illustration, all of the connections have been applied to connect a type "F" coupler designated as 1 for relative universal movement to an associated vertical yoke 2. In a typical installation, such as shown in Figure 1, the coupler 1 is supported at coupling height by a resilient coupler carrier 3 engaging its shank 4 and has its usual spherically and cylindrically surfaced convex butt 5 socketed within the yoke 2 in a spherically concave front face 6 of a front follower 7 through which the coupler acts directly in buff on a draft gear or other cushioning mechanism 8 pocketed in the yoke. Mounted in the center sills 9 of a railway car (not shown), the yoke 2 is connected to the coupler 1 by a single connecting, yoke or pivot pin 10 and, conventionally, is supported beneath the connecting pin 10 by a removable support plate 11. Extending or fitting between and contained, straddled or embraced by the vertically spaced arms or straps 12 of the yoke, the butt portion 5 of the coupler has a vertically directed aperture 13 through which the connecting pin 10 extends and onto which opens a horizontally directed, [cylindrically] *arcuately* concave pocket, recess or socket 14, *circularly concave in central section and* formed in the front or aperture and confronting face 15 of the rear or back wall 16 of the coupler. The connecting pin 10, outwardly or above and below the butt portion 5 of the coupler 1, has its ends 17 rotatably received in pin-receiving openings or holes 18 extending through the arms 12 of the yoke 2. Uniform in this general construction, the several exemplary forms differ in detail and will now be described separately.

Figure 2:
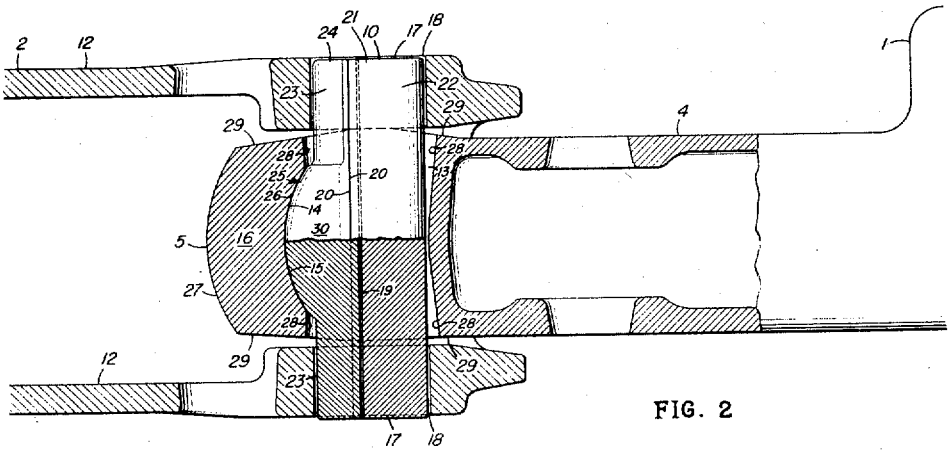
Figure 2 is a fragmentary vertical sectional view on an enlarged scale of the connection of Figure 1 with portions shown in side elevation.
Figure 3:
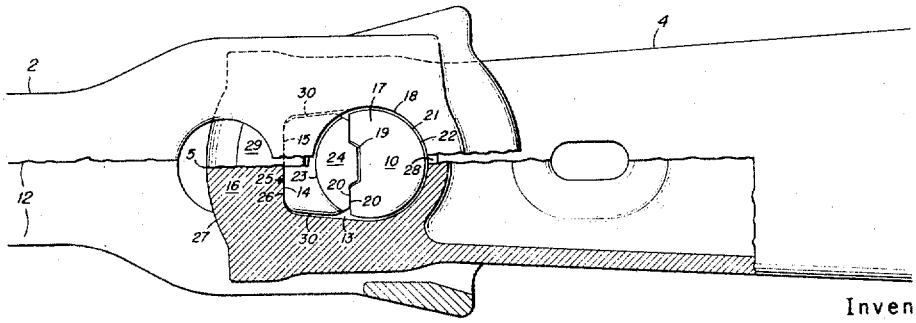
Figure 3 is a plan view of the structure of Figure 2 with portions broken away and shown in section to more clearly illustrate certain of the details of construction.

Considering first the embodiment of Figures 2 and 3, its connecting pin 10 is split axially or longitudinally into a pair or plurality of sections or parts interlockable against relative transverse movement and for rotation in unison by an axially extending tongue and groove joint 19 between their confronting faces 20. The front part 21 of the split or sectional pin 10 has a cylindrical outer surface 22. While having a cylindrical outer surface 23 coaxial with that 22 of the front part 21 over its end portions, the rear part or section 24 of the pin 10 intermediate its ends carries or has a rearwardly projecting protuberance or bulge 25 formed integrally with it and having [a cylindrically] *an arcuately* convex rear surface 26, *circularly convex in central section and* [struck about an axis extending or directed transversely of the coupler and normal or at right angles to the axis of the pin and] coradial and mating or interfitting with or engaging the forwardly facing [cylindrical] *correspondingly configured* pocket 14 in the butt portion 5 of the coupler, *the surface 26 being illustrated as cylindrical and struck about an axis extending or directed transversely of the coupler and normal or at right angles to the axis of the pin.* With the [cylindrical] surface 26 on the protuberance 25 and the pocket 14 coaxial when engaged, their common *center or* axis may *be at or* pass through the center of the spherically convex central portion 27 of the butt 5 so that both the protuberance and the butt will have full bearing with the pocket and the front face 6 of the front follower 7 on vertical angling of the coupler in buff. However, to enable the pin to be given greater strength by extending the protuberance further toward either end of the pin, it is preferred that the common [axis] *center* of the surface 26 and pocket 14 be disposed forwardly of the center of the portion 27 with the pin correspondingly spaced from the front end of the aperture 13. With this construction, on vertical angling of the coupler in buff the butt will have full bearing with the front follower while the protuberance will be slightly spaced from the pocket and, in draft, these relations will be reversed so that in neither case will there be interference by one pair of matable surfaces with vertical angling of the coupler when the other pair is mated. Whether the common [axis] *center* of the surface 26 and protuberances 25 [passes through] *is at* or forwardly of the center of the portion 27, the coupler 1 will be enabled to angle or pivot vertically within the limits imposed by the tapered stop surfaces 28 at the front and rear of the aperture 13 and the corresponding taper of the top and bottom walls 29 of the butt portion 5 relative to the embracing arms 12 of the yoke 2. While the integrality of the protuberance 25 with the rear part 26 of the pin 10 locks the pin and coupler against relative horizontal angling, the cylindrical ends 17 of the pin are rotatable about its vertical axis in the pin-receiving openings 18 in the arms 12 of the yoke 2, so that the coupler, moving with the pin, may angle horizontally relative to the yoke.

It is contemplated in this embodiment to retain the usual cylindrical configuration of the pin-receiving openings 18 in the arms 12 of the yoke 2. To this end, the connecting pin 10 is split or divided axially rearwardly of its center and the sides 30 of the protuberance 25 are tapered both forwardly and rearwardly in order that the rear part 26, alone, may be free to pass through the pin-receiving openings 18 in the yoke and the aperture 13 in the coupler. With this construction, connection of the coupler and yoke simply is a matter of first inserting the rear part 26 and, after the latter's protuberance 25 is seated in the pocket 14 in the coupler, then sliding in the front part 21. Thereafter, the parts of the pin will be locked against relative transverse movement by the tongue and groove joint 19 between their confronting faces 20 and held against relative vertical movement by the support plate 11 on which the bottom of the connecting pin rests.

Figure 4:
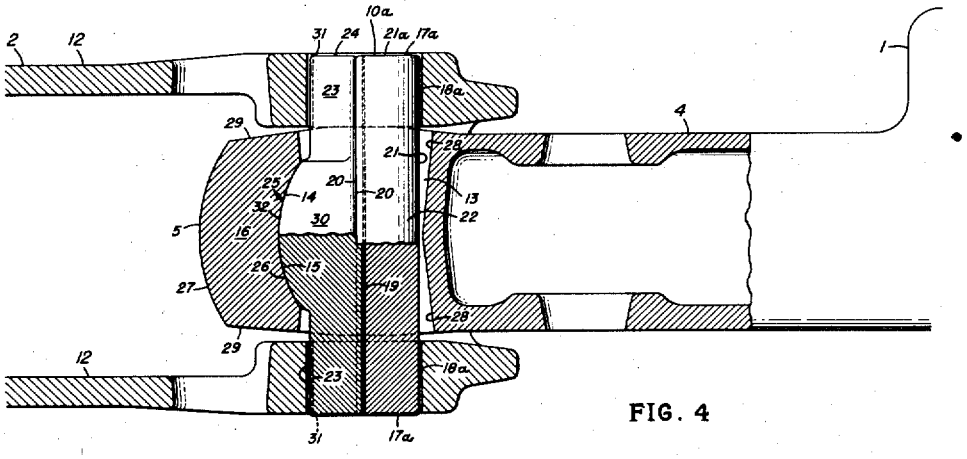
Figure 4 is a view corresponding to Figure 2 of another embodiment of the connection of the present invention.
Figure 5:
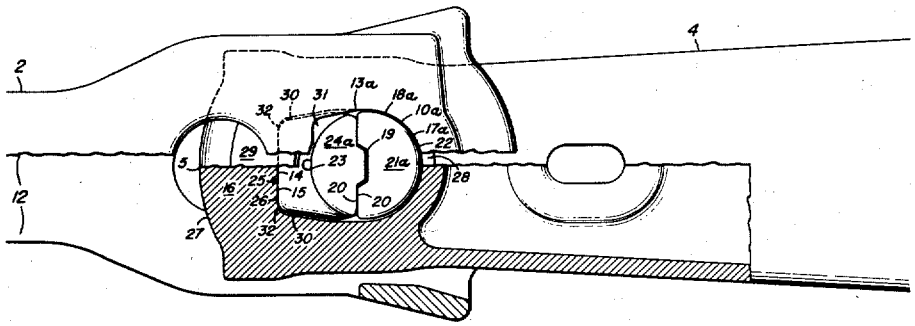
Figure 5 is a view corresponding to Figure 3 of the structure of Figure 4.

The embodiment of Figures 4 and 5 is the same as that of the first embodiment except that its connecting pin 10a is split axially or longitudinally substantially at its center, necessitating the provision of slots 31 at either side of one or both of the pin-receiving openings 18a in the arms 12 of the coupler so as to pass the corners 32 of the protuberance 25.

Figure 7:
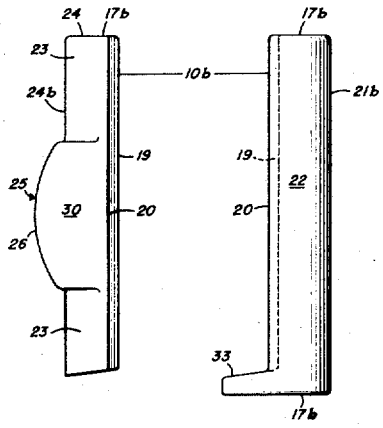
Figure 7 is an exploded side elevational view of the pin of Figure 6.
Figure 6:
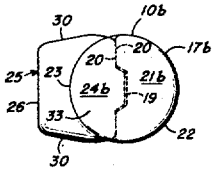
Figure 6 is a plan view of one form of split connecting pin for use in the connections of the preceding figures.

A variation of the connecting pin of either of the preceding embodiments is shown in Figures 6 and 7, the connecting pin 10b there illustrated having its rear part 24b shortened toward its lower end and adapted to rest on a foot 33 integral with and projecting rearwardly from the front part 21b. This construction has the advantage of limiting contact between the connecting pin 10b and the support plate 11 to the front part 21b of the pin and enabling a standard plate to be used instead of the wider plate required for pins split from end to end.

Figure 8:
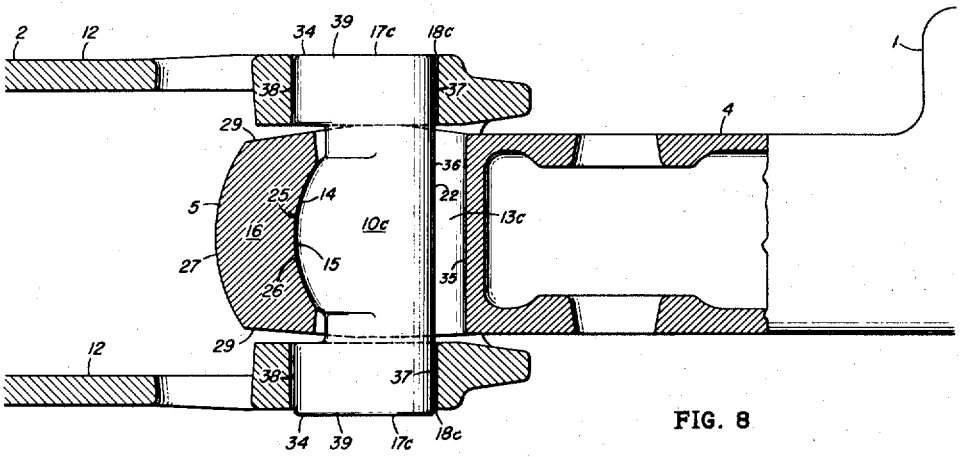
Figure 8 is a view corresponding to Figure 1 of another embodiment of the connection of the present invention.
Figure 9:
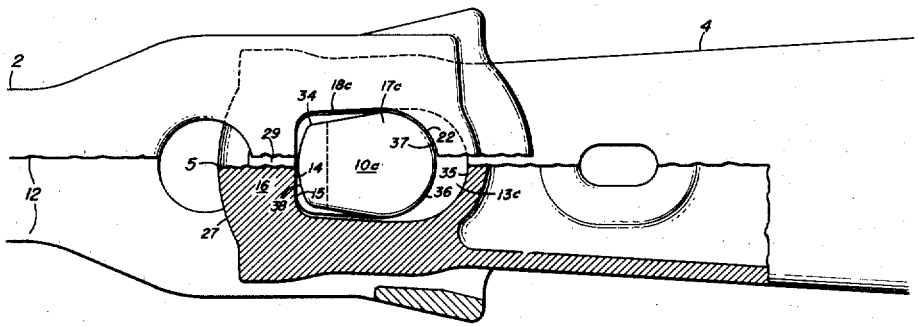
Figure 9 is a view corresponding to Figure 2 of the structure of Figure 8.
Figure 10:
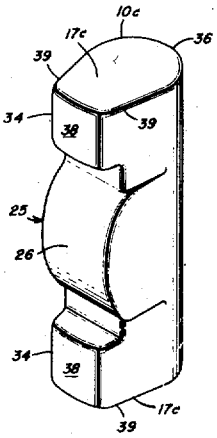
Figure 10 is a perspective view of the connecting pin used in the connections of Figures 8 and 9.

In the embodiment of Figures 8–10, the split or sectional connecting pin of the earlier embodiments is replaced by a one-piece or solid pin 10c, having intermediate its ends an integral rearwardly facing protuberance 25, identical with that of the preceding pins. The connecting pin of this embodiment requires the aperture 13c in the butt portion 5 of the coupler to be extended or elongated forwardly and the pin-receiving openings 18c in the yoke to be correspondingly elongated or extended rearwardly so as to pass the intermediate portion of the pin during insertion or removal. When, as with certain types of cushioning mechanisms, it is desired that the coupler move rearwardly relative to the yoke in buff, the ends 17c of this pin may be cylindrical so as to afford rearward longitudinal play between the pin and the yoke as well as between the coupler and the pin. However, when as in the illustrated embodiment, it is desired to minimize such movement, the ends 17c of the pin have tail portions 34 extended rearwardly in correspondence with the rearward elongation of the pin-receiving openings 18c so that the only play in the connection is that afforded by the spacing of the front wall 35 of the aperture 13c in the coupler from the connecting pin 10c. Since in this, as well as in the preceding embodiments, the coupler 1 is dependent for horizontal angling on rotatability of the connecting pin 10c relative to the yoke, the front half or head 36 of each end 17c is cylindrical and the forepart 37 of each opening 18c is of corresponding configuration. Also, the ends 38 of the tail portions 34 are arcuately convex and the sides 39 of the tail portions taper or converge rearwardly and each normally is disposed at a sufficient angle relative to the confronting of the sides 39 of the associated opening 18c for the connecting pin to rotate in the openings 18c at least to the otherwise predetermined limits of the horizontal angling of the coupler relative to the yoke.

From the above detailed description, it will be apparent that there has been provided an improved universal coupler and yoke connection employing a single pin whereby the coupler, without detriment to its universal angling relative to the yoke, may have its rear wall thickened and thus strengthened beyond the point of possible breakage. It should be understood that the described and disclosed embodiments are merely exemplary of the invention and that all modifications are intended to be included which do not depart from either the spirit of the invention or the scope of the appended claims.

Having described my invention, I claim:

1. In a universal coupler and yoke connection, the combination with a coupler and a yoke, of a connecting pin extending through a vertically directed aperture in a butt portion of said coupler and having its ends rotatably received in openings in arms of said yoke embracing said butt portion, and a protuberance integral with and extending rearwardly from a rear part of said pin, said protuberance having a cylindrically convex surface struck about a substantially horizontal axis extending transversely of said butt portion and interfitting and coaxial with a cylindrically concave recess in said butt portion and opening forwardly onto said aperture.

2. In a universal coupler and yoke connection, the combination with a coupler and a yoke, of a split connecting pin extending through a vertically directed aperture in a butt portion of said coupler and having its ends rotatably received in openings in arms of said yoke embracing said butt portion, and a protuberance integral with and extending rearwardly from a rear part of said pin, said protuberance having a cylindrically convex surface struck about a substantially horizontal axis extending transversely of said butt portion and interfitting and coaxial with a cylindrically concave recess in said butt portion and opening forwardly onto said aperture, and said pin being so split longitudinally as to be insertible rear part first into said aperture through one of said openings.

3. In a universal coupler and yoke connection, the combination with a coupler having in a butt portion thereof forwardly of its butt, a vertically directed aperture and a cylindrically concave recess opening forwardly onto said aperture and struck about a substantially horizontal axis extending transversely of said butt portion, a yoke having arms straddling said butt portion, and openings in said arms aligning with said aperture, of a connecting pin extending through said aperture and having its ends rotatably received in said openings, and a protuberance integral with and projecting rearwardly from a rear part of said pin and having a cylindrically convex surface interfitting and coaxial with said recess.

4. In a universal coupler and yoke connection, the combination with a coupler having in a butt portion thereof forwardly of its butt, a vertically directed aperture and a cylindrically concave recess opening forwardly onto said aperture and struck about a substantially horizontal axis extending transversely of said butt portion, a yoke having arms straddling said butt portion, and openings in said arms aligning with said aperture, of a split pin having an intermediate portion seatable in said aperture and end portions rotatably receivable in said openings, and a protuberance integral with and projecting rearwardly from a rear part of said pin within said intermediate portion and having a cylindrically convex surface engageable and coradial with said recess, said pin being so split longitudinally as to be insertible rear part first into said aperture through one of said openings.

5. In a universal coupler and yoke connection, the combination with a coupler having in a butt portion thereof forwardly of its butt, a vertically directed aperture and a cylindrically concave recess opening forwardly onto said aperture and struck about a substantially horizontal axis extending transversely of said butt portion, a yoke having arms straddling said butt portion, and openings in said arms aligning with said aperture, of a split pin having an intermediate portion seatable in said aperture and end portions rotatably receivable in said openings, a protuberance integral with and projecting rearwardly from a rear part of said pin within said intermediate portion and having a cylindrically convex surface interfittable and coradial with said recess, said pin being so split axially as to be insertible rear part first into said aperture through one of said openings, and a foot portion projecting rearwardly from a front part of said pin and underlying and supporting said rear part.

6. In a universal coupler and yoke connection, the combination with a coupler having in a butt portion thereof forwardly of its butt, a vertically directed aperture and a cylindrically concave recess opening forwardly onto said aperture and struck about a substantially horizontal axis extending transversely of said butt, a yoke having arms straddling said butt portion, and openings in said arms aligning with said aperture, of a one-piece connecting pin having an intermediate portion seatable in said aperture and end portions rotatably receivable in said openings, and a protuberance integral with and projecting rearwardly from a rear part of said pin within said intermediate portion and having a cylindrically convex surface engageable and coradial with said recess, said aperture being forwardly and said openings being rearwardly elongated for insertion of said pin into said aperture through one of said openings.

7. In a universal coupler and yoke connection, the combination with a yoke having vertically spaced arms, of a coupler having a butt portion extending between said arms, a vertically directed aperture extending through said butt portion and alignable with openings in said arms, a cylindrically concave recess opening forwardly onto said aperture and struck about an axis extending substantially normal to the direction of said aperture and transversely of said butt portion, a one-piece connecting pin having an intermediate portion seatable in said aperture and end portions rotatably receivable in said openings, a protuberance integral with and projecting rearwardly from said intermediate portion and having a cylindrically convex surface interfittable and coradial with said recess, said aperture being forwardly and said openings being rearwardly elongated for insertion of said pin into said aperture through one of said openings, and said end portions of said pin being rearwardly elongated and having sides normally disposed angularly relative to confronting sides of said openings for limited rotative movement between said pin and yoke.

*8. In a universal coupler and yoke connection, the combination with a coupler and a yoke, of a connecting pin extending through a vertically directed aperture in a butt portion of said coupler and having its ends rotatably received in openings in arms of said yoke embracing said butt portion, and a protuberance integral with and extending rearwardly from a rear port of said pin, said protuberance having an arcuately convex surface interfitting and coaxial with a correspondingly concave recess in said butt portion and opening forwardly onto said aperture for relative angling between said coupler and pin.*

*9. In a universal coupler and yoke connection, the combination with a coupler and a yoke, of a connecting pin extending through a vertically directed aperture in a butt portion of said coupler and having its ends rotatably received in openings in arms of said yoke embracing said butt portion, and a protuberance integral with and extending rearwardly from a rear part of said pin, said pro-*

*tuberance having a convex surface interfitting and coaxial with a correspondingly concave recess in said butt portion and opening forwardly onto said aperture for relative angling between said coupler and pin.*

*10. In a universal coupler and yoke connection, the combination with a coupler and a yoke, of a split connecting pin extending through a vertically directed aperture in a butt portion of said coupler and having its ends rotatably received in openings in arms of said yoke embracing said butt portion of said coupler and having its ends rotatably received in openings in arms of said yoke*

*embracing said butt portion, and a protuberance integral with and extending rearwardly from a rear part of said pin, said protuberance having an arcuately convex surface interfitting and coaxial with a correspondingly concave recess in said butt portion and opening forwardly into said aperture for relative angling between said coupler and pin, and said pin being so split longitudinally as to be insertible rear part first into said aperture through one of said openings.*

No references cited.